US008607910B2

(12) United States Patent
Haller et al.

(10) Patent No.: US 8,607,910 B2
(45) Date of Patent: Dec. 17, 2013

(54) VEHICLE SUSPENSION DEVICE FOR VEHICLE SEATS OR VEHICLE CABS

(75) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 19 days.

(21) Appl. No.: 13/210,557

(22) Filed: Aug. 16, 2011

(65) Prior Publication Data

US 2012/0043798 A1     Feb. 23, 2012

(30) Foreign Application Priority Data

Aug. 18, 2010    (DE) .................. 10 2010 034 857

(51) Int. Cl.
     *B62D 33/10*      (2006.01)

(52) U.S. Cl.
     USPC ....................................................... 180/89.12

(58) Field of Classification Search
     USPC ....................................................... 180/89.12
     See application file for complete search history.

(56) References Cited

U.S. PATENT DOCUMENTS

| | | | | |
|---|---|---|---|---|
| 2,489,981 A | * | 11/1949 | Rose | 248/582 |
| 3,882,956 A | | 5/1975 | Plegat | |
| 4,714,227 A | * | 12/1987 | Holm et al. | 248/595 |
| 5,221,071 A | * | 6/1993 | Hill | 297/344.14 |
| 5,553,911 A | * | 9/1996 | Bodin et al. | 296/190.07 |
| 5,555,501 A | * | 9/1996 | Furihata et al. | 701/37 |
| 5,899,288 A | * | 5/1999 | Schubert et al. | 180/89.12 |
| 6,478,102 B1 | * | 11/2002 | Puterbaugh et al. | 180/89.12 |
| 6,758,294 B2 | * | 7/2004 | Peddycord et al. | 180/89.12 |
| 6,773,049 B2 | * | 8/2004 | Rupiper et al. | 296/63 |
| 7,077,226 B2 | * | 7/2006 | Oliver et al. | 180/89.12 |
| 7,077,227 B2 | * | 7/2006 | Oliver et al. | 180/89.12 |
| 7,240,754 B2 | * | 7/2007 | Barta et al. | 180/89.12 |
| 7,300,100 B2 | * | 11/2007 | McLean et al. | 296/190.07 |
| 7,331,627 B2 | * | 2/2008 | Van Den Brink et al. | 296/190.07 |
| 7,744,149 B2 | * | 6/2010 | Murray et al. | 296/190.07 |
| 7,882,914 B2 | * | 2/2011 | Scheele et al. | 180/89.14 |
| 7,950,726 B2 | * | 5/2011 | Brown | 296/190.07 |
| 8,095,268 B2 | * | 1/2012 | Parison et al. | 701/37 |
| 8,182,038 B2 | * | 5/2012 | Haller | 297/344.16 |

(Continued)

FOREIGN PATENT DOCUMENTS

| | | |
|---|---|---|
| DE | 2317824 | 10/1973 |
| DE | 7419891 | 6/1974 |

(Continued)

OTHER PUBLICATIONS

Office Action prepared by German Patent Office on Jun. 9, 2011, for German Application No. 102010034857.0.
Search Report for European Patent Application No. 11176385.0, dated Dec. 22, 2011 12 pages.

*Primary Examiner* — Nicole Verley
(74) *Attorney, Agent, or Firm* — Sheridan Ross P.C.

(57) ABSTRACT

The invention relates to a vehicle suspension device for a vehicle seat (4, 4a, 4b) or a vehicle cab (3) comprising a lower part (20) and an upper part (4a, 4b) spring-mounted relative to the lower part (20) by means of at least one spring device, wherein the upper part (4a, 4b) is mounted relative to the lower part (20) in such a way that it is pivotable (17) about an imaginary or real axis (15) extending in the vehicle width direction or vehicle length direction (8) when vibrations occur between the upper part (4a, 4b) and the lower part (20).

13 Claims, 12 Drawing Sheets

(56) References Cited

U.S. PATENT DOCUMENTS

| | | | |
|---|---|---|---|
| 8,186,475 B2* | 5/2012 | Sugden et al. | 180/326 |
| 8,225,903 B2* | 7/2012 | Dunn | 180/327 |
| 8,261,869 B2* | 9/2012 | Turco et al. | 180/89.12 |
| 8,265,832 B2* | 9/2012 | Haller et al. | 701/48 |
| 2005/0051373 A1* | 3/2005 | Bernhardt et al. | 180/89.12 |
| 2005/0224269 A1* | 10/2005 | Dahl | 180/89.12 |
| 2006/0237885 A1* | 10/2006 | Paillard et al. | 267/140.15 |
| 2009/0045000 A1* | 2/2009 | Brown | 180/89.12 |

FOREIGN PATENT DOCUMENTS

| | | |
|---|---|---|
| DE | 2537174 | 8/1975 |
| DE | 19907658 A1 | 2/1999 |
| GB | 1432614 | 4/1976 |
| WO | WO 2007/058572 | 5/2007 |

* cited by examiner

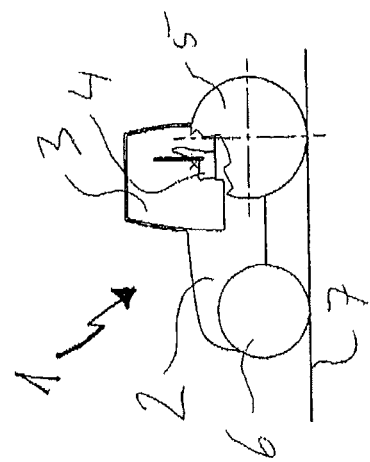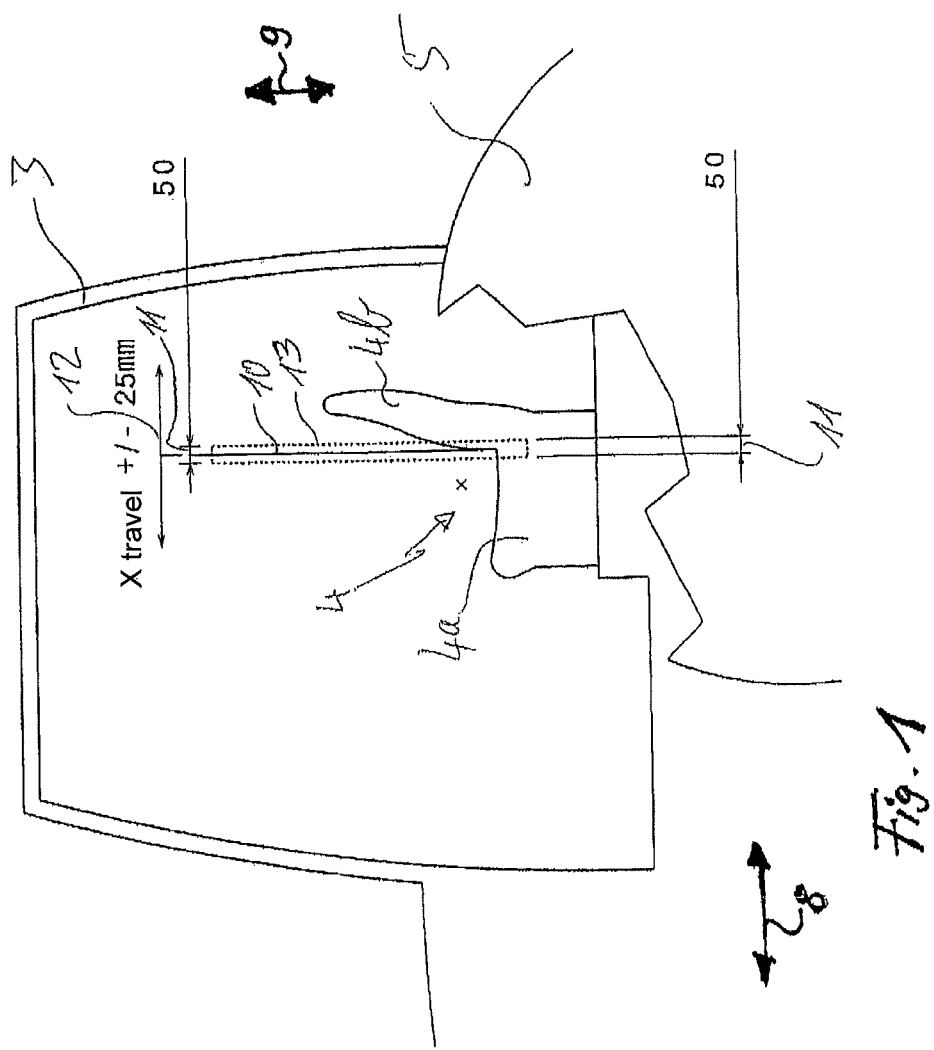
Fig. 1

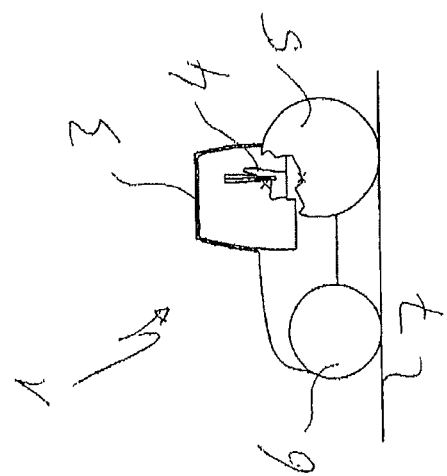
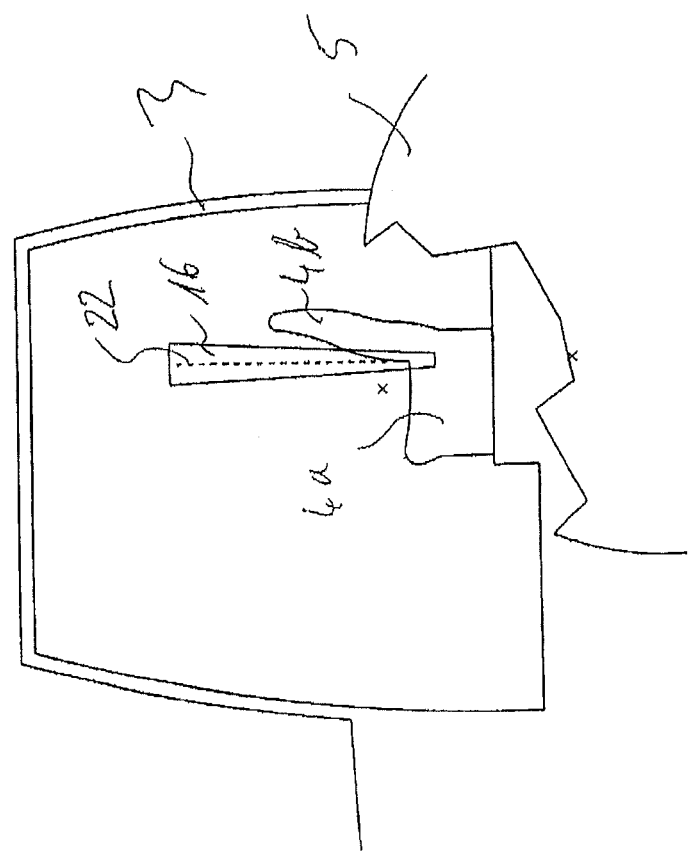
Fig. 3

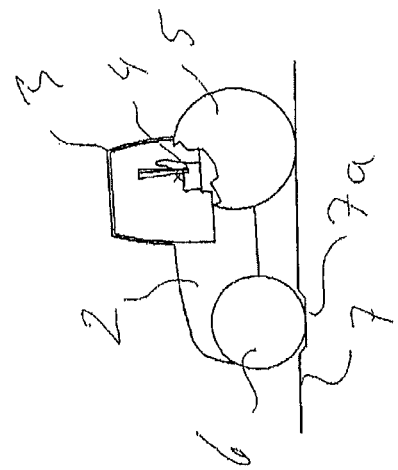
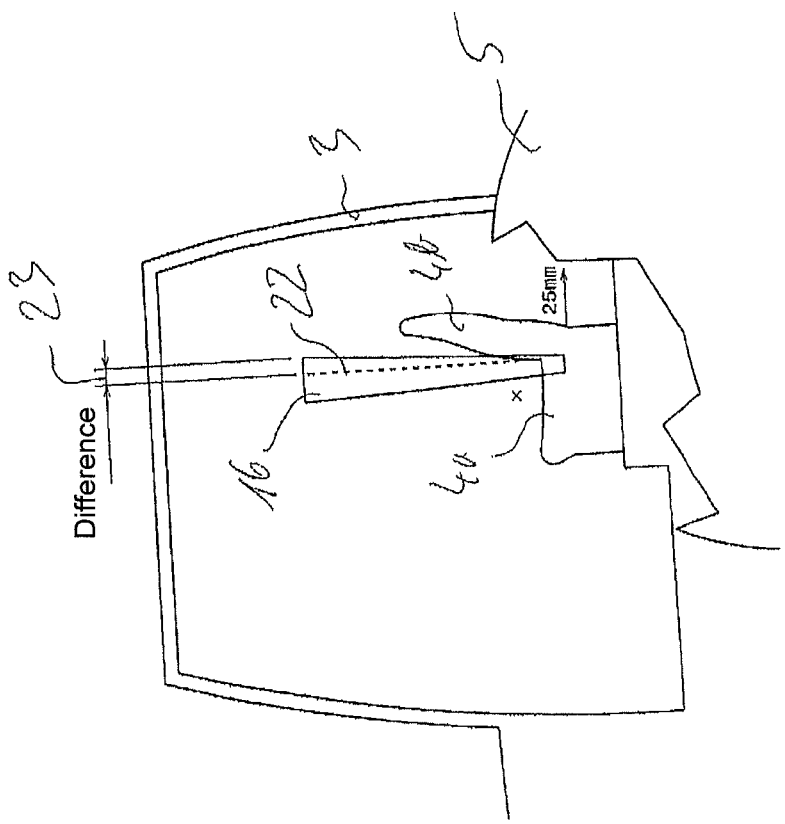
Fig. 4

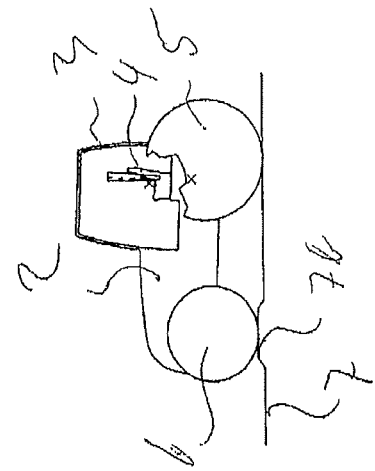
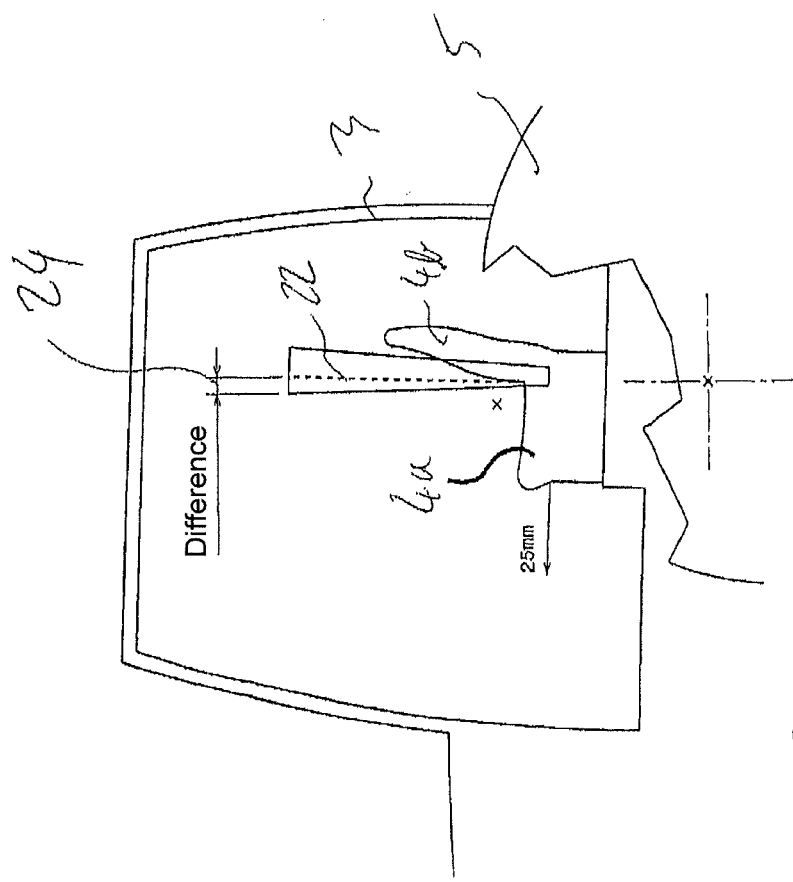
Fig. 5

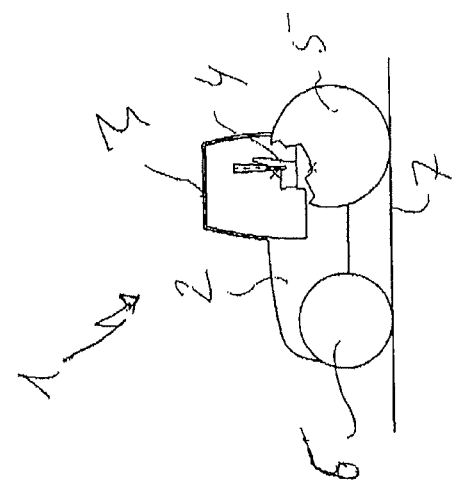
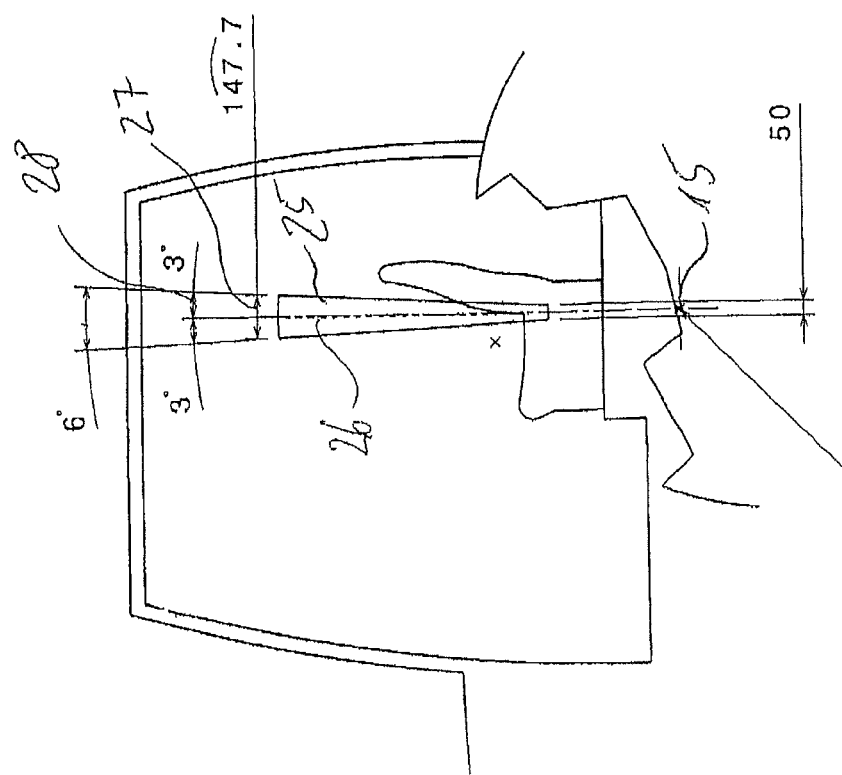
Fig. 6

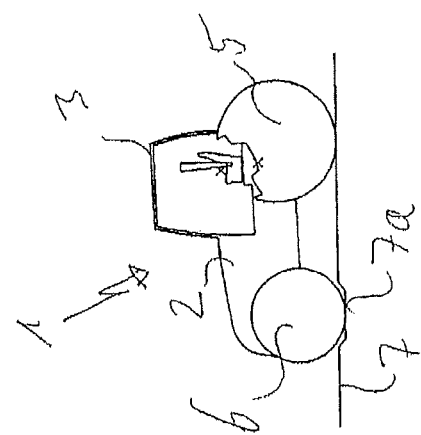
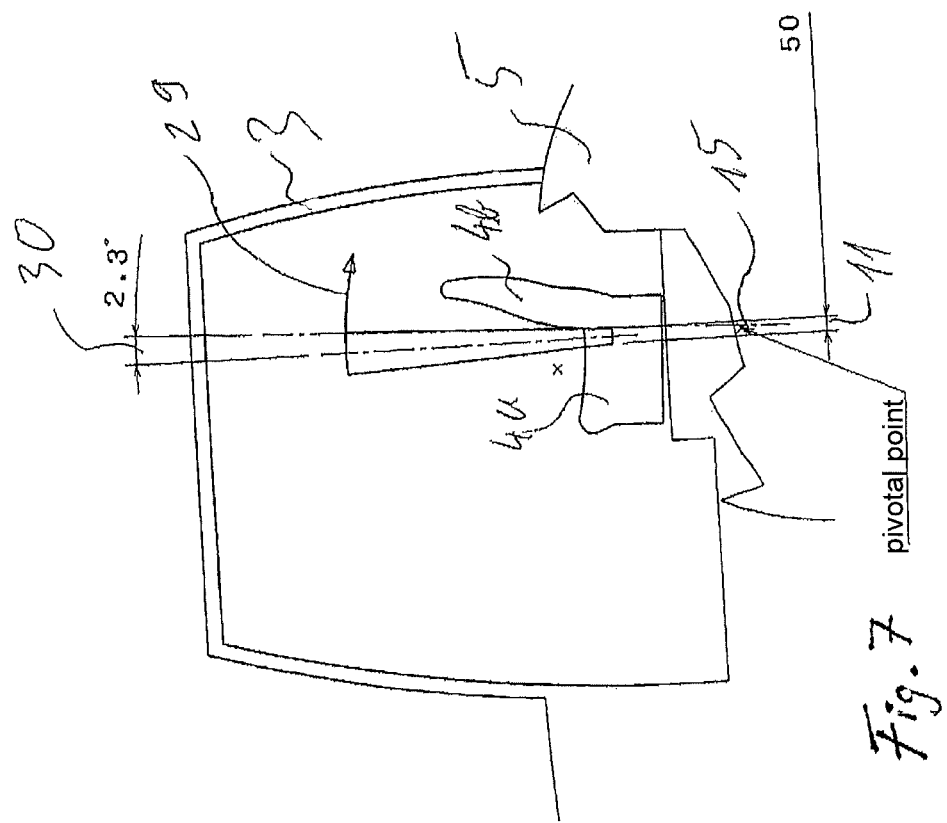
Fig. 7

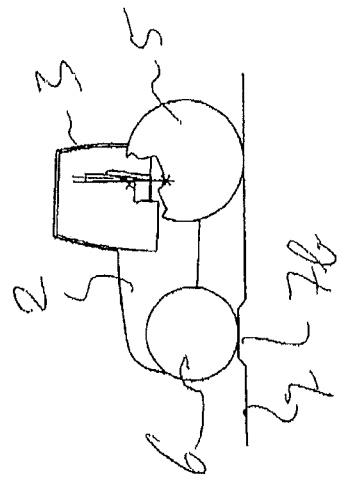
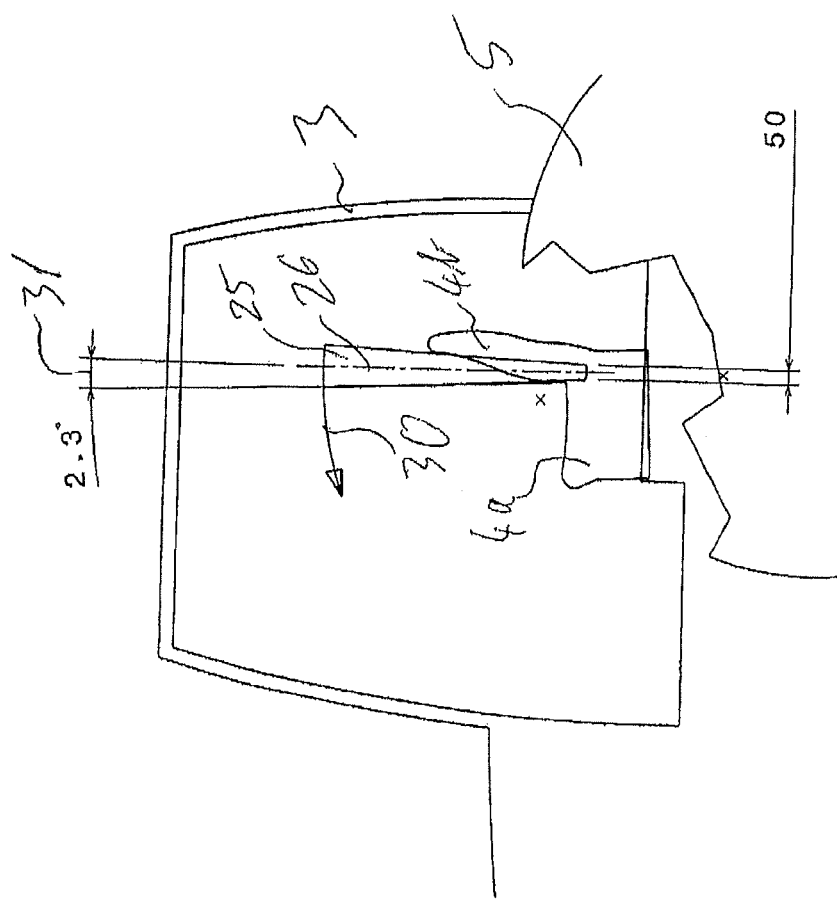
Fig. 8

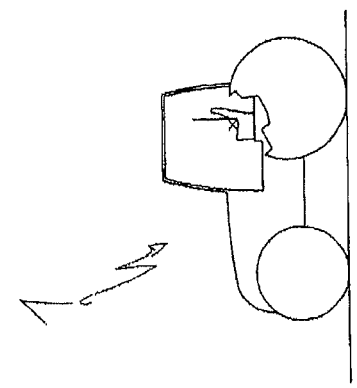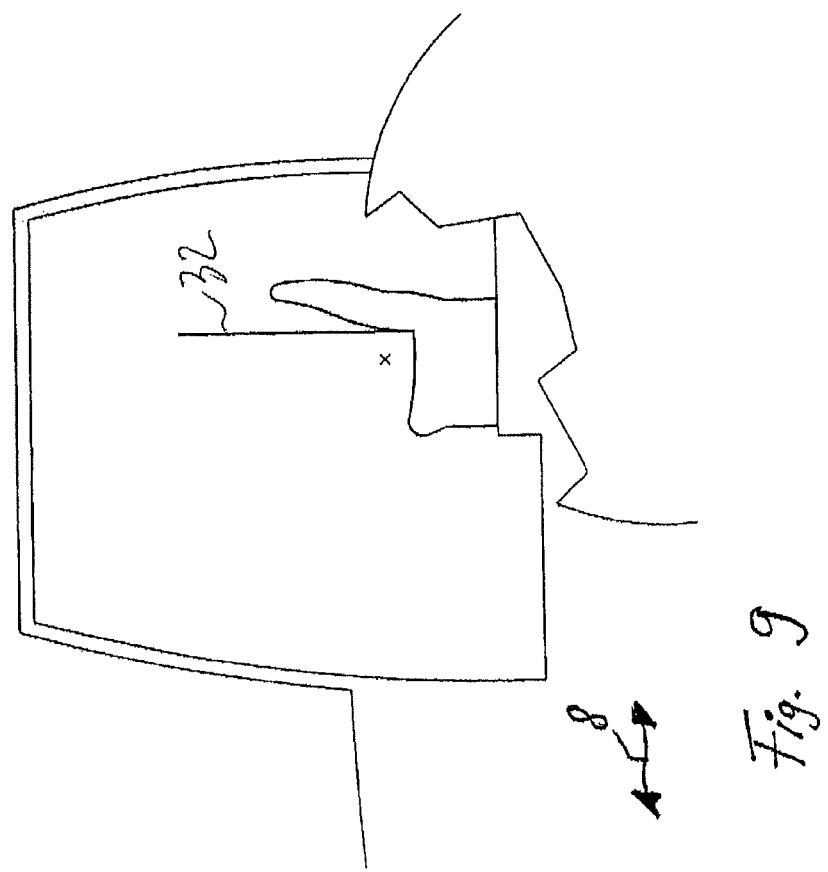
Fig. 9

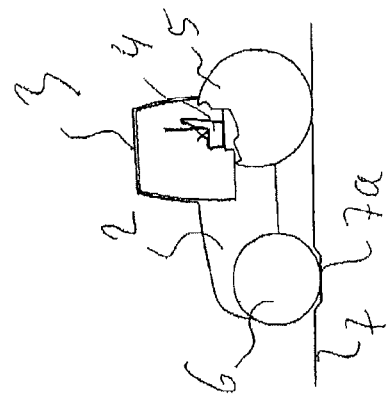
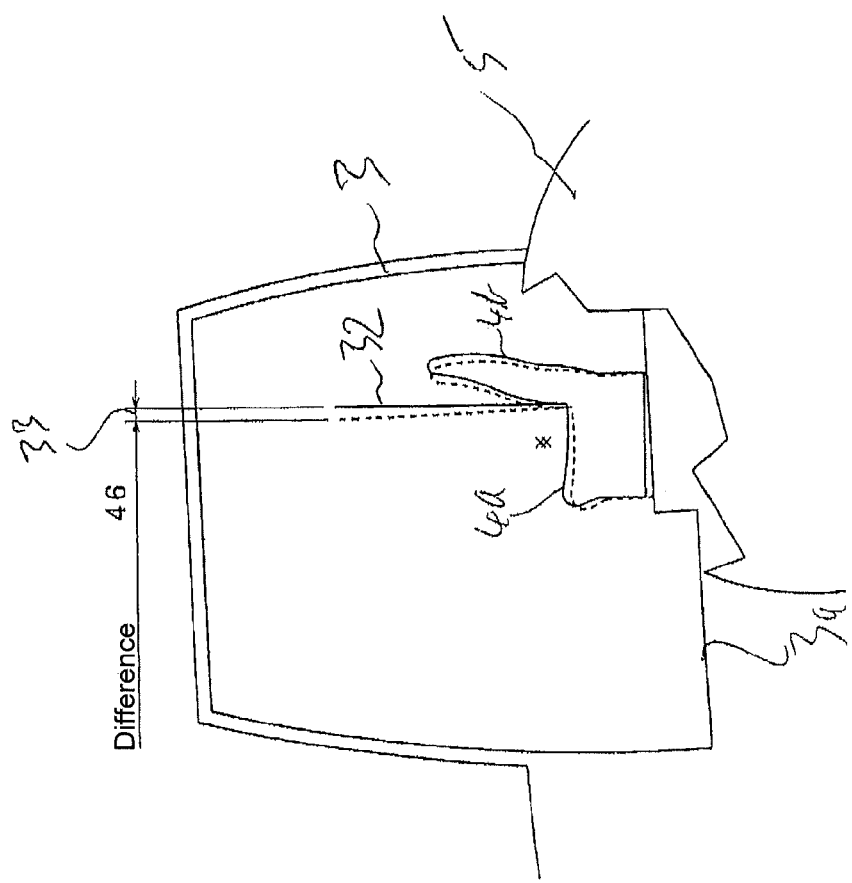
Fig. 10

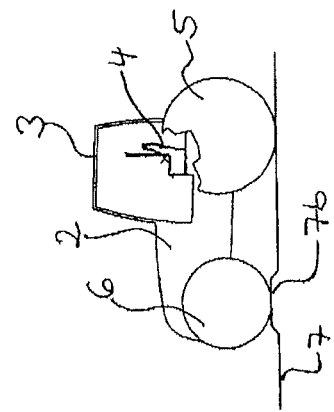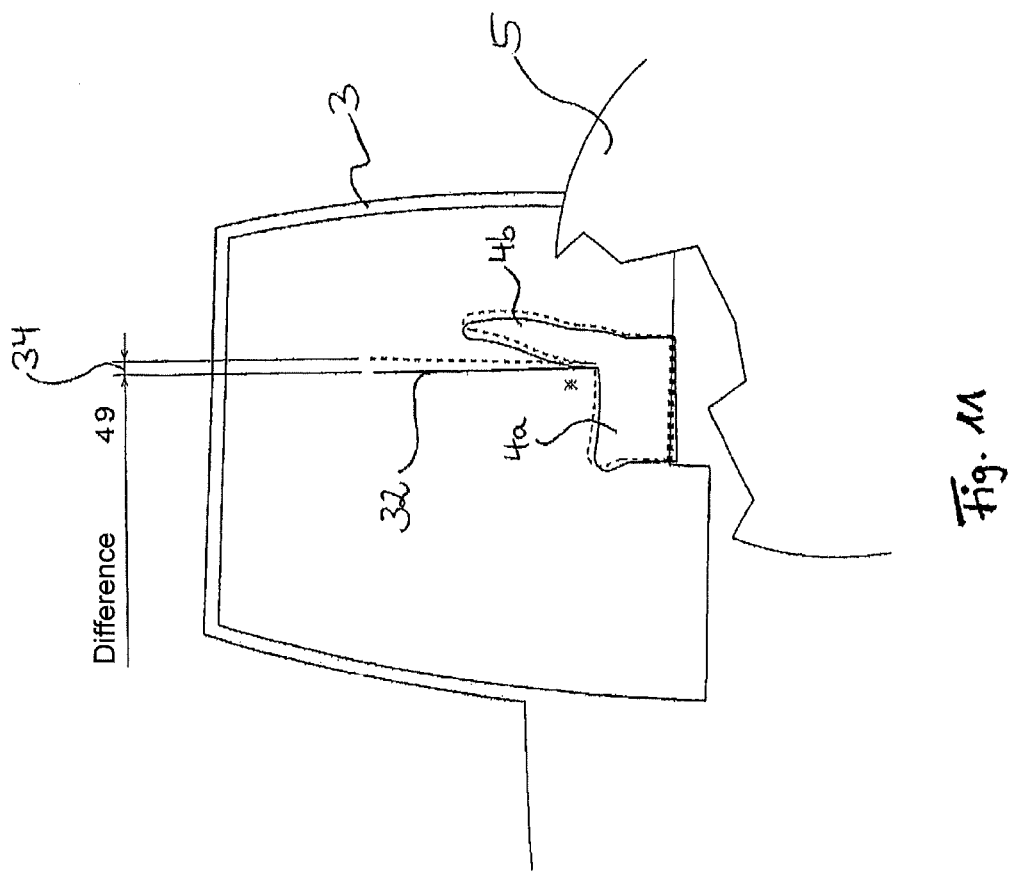

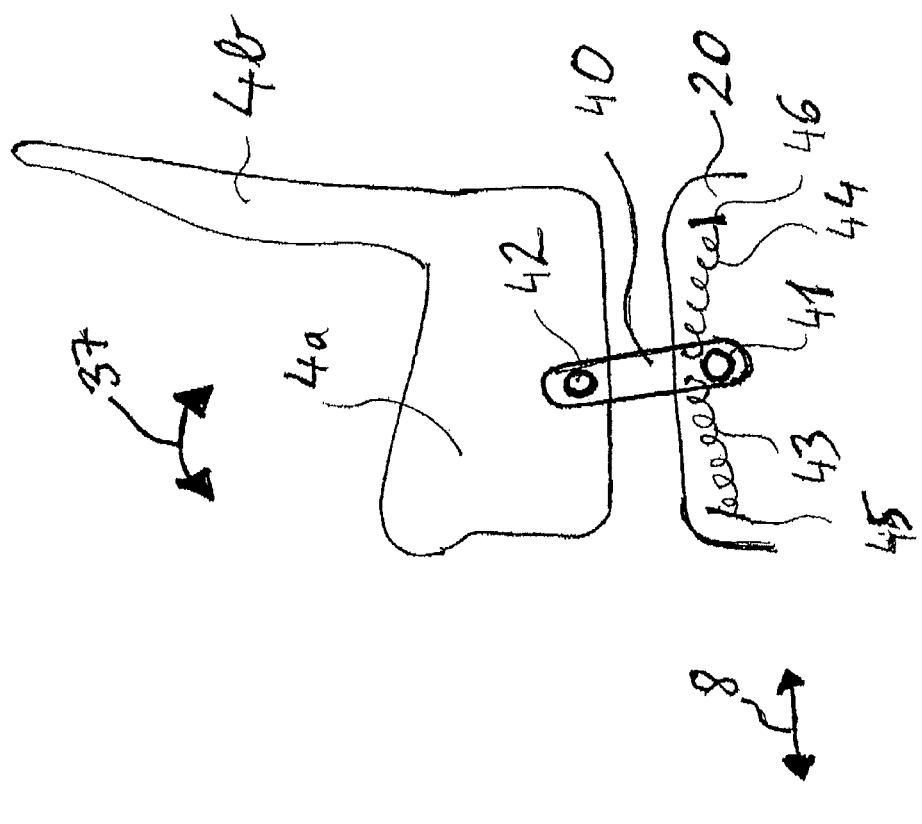

VEHICLE SUSPENSION DEVICE FOR VEHICLE SEATS OR VEHICLE CABS

CROSS REFERENCE TO RELATED APPLICATIONS

This application claims the benefit of German Application No. 102010034857.0 FILED Aug. 18, 2010, the entire disclosure of which is hereby incorporated by reference.

The invention relates to a vehicle suspension device for a vehicle seat or a vehicle cab comprising a lower part and an upper part which is spring-mounted relative to the lower part by means of at least one spring device, according to the preamble of claim 1.

Vehicle suspension devices, particularly for vehicle seats, are configured in such a way that they form a oscillating-type and sprung-type mounting between an upper part and a lower part, in this case between a vehicle seat part and a lower part of a vehicle seat substructure. By way of example, a vehicle seat with its seat part may be connected by means of scissor arms to a lower part which is attached to a vehicle cab floor or to a body of the vehicle, wherein spring devices and/or damping devices are additionally arranged between the upper part and the lower part in order to absorb a vibration oriented in the vertical direction which is introduced into the system of the vehicle seat from outside.

There are also horizontal suspension devices which serve to absorb or dampen vibrations which are introduced into the system of the vehicle seat in the horizontal direction. To this end, the upper part of the vehicle seat is spring-mounted in the horizontal direction relative to the lower part of the vehicle seat and can absorb vibrations introduced in the horizontal or transverse direction.

Vibrations introduced horizontally into the system of the sprung vehicle seat or of a sprung vehicle cab often occur when a utility vehicle in which this vehicle seat or the vehicle cab is arranged travels with its front wheels into a trough or over a ridge and as a result the vehicle seat or the vehicle cab briefly experiences in the vehicle length direction a slowing or an acceleration in comparison to the rest of the vehicle. This is due inter alia to the fact that the driver's weight is displaced with a certain inertia relative to the movement of the vehicle, in a time-delayed or accelerated manner. A pure horizontal stimulus preferably occurs when starting for example from a stiff substructure (unsprung vehicle) and a horizontal impact for example of the trailer, e.g. through the overrun brake. Travelling over troughs and stones with the front wheel preferably leads at least partially to a rotational movement about the contact point of the rear wheel at a distance r (=distance from the contact point to the seat surface). When the rear wheel then rolls over the unevenness, this likewise leads to a rotational movement about the contact area of the front wheel. This impact is preferably absorbed predominantly by the vertical suspension, since this is almost above the point of stimulus or contact area of the rear wheel.

In the case of such horizontally oriented vehicle suspension devices, the problem often arises that the vibrations introduced into the system of a vehicle seat or vehicle cab can be absorbed only in a direction parallel to the vehicle floor on which the vehicle seat is arranged. However, this describes a vehicle which travels for example with its front axle over a ridge or a raised unevenness on the road, in particular one or more stones, branches or the like, or into a trough, which not only experiences a brief change in speed merely in the horizontal direction, but instead a kind of tilting movement of the entire vehicle, which is also associated with a slight deflection, takes place about an axis extending in the vehicle width direction.

In the event of such a tilting movement or pitch movement, vehicle seats known to date have the possibility of absorbing the introduced vibrations as follows: for the first degree of freedom of vibrations in the vertical direction (Z axis), a vehicle suspension device which extends vertically relative to the vehicle floor is provided between a vehicle seat upper part and a vehicle seat lower part. In addition, damping devices may be provided in the vertical direction. For the vibrations introduced in the longitudinal horizontal direction relative to the vehicle floor, the so-called horizontal vehicle suspension devices are provided according to the second degree of freedom (X axis) in the direction of the longitudinal axis of the vehicle. For the third degree of freedom (Y axis), vehicle suspension devices which act horizontally in the vehicle width direction may be provided.

To date, therefore, three vehicle suspension devices which are to be considered separately from one another are provided for a total of three degrees of freedom along the X axis, Y axis and Z axis of a vehicle. The spring travels required for damping introduced vibrations are always directed along the vehicle axes. Conventionally, such spring travels in the vertical direction are limited in terms of their size to approx. 100 mm. In the case of spring travels acting longitudinally and lateral-horizontally, this depends on the construction and the safety requirements of the surrounding environment, as defined by the accessibility of control elements and the positions of scissors-type elements. Such horizontally acting spring travels are usually limited to +/−25 mm both in the X axis and in the Y axis. A tilting or pitch movement of the vehicle cannot be compensated or can be compensated only insufficiently by such vehicle suspension devices arranged separately from one another, due to the fixed degrees of freedom of the individual vehicle suspension devices in terms of their spring travels.

Accordingly, the object of the present invention is to provide a vehicle suspension device for a vehicle seat or a vehicle cab, which provides a higher degree of seating comfort for the person driving the vehicle when travelling over a trough or a ridge.

This object is achieved according to the features of claim 1.

The core concept of the invention is that, in a vehicle suspension device for a vehicle seat or a vehicle cab comprising a lower part and an upper part spring-mounted relative to the lower part by means of at least one spring device, the upper part is mounted relative to the lower part in such a way that it is pivotable about an imaginary or real axis extending in the vehicle width direction or vehicle length direction when vibrations occur between the upper part and the lower part. By arranging such an axis or configuring the mounting of the upper part relative to the lower part in such a way that a pivoting movement is possible, the situation can advantageously be achieved whereby, when travelling over a pothole or a ridge, the pitch or tilting movement carried out by the vehicle or a type of rolling movement of the vehicle suspension device can be compensated. This is because when the vehicle travels for example over a ridge and thus is deflected upwards with the front wheels, wherein at the same time a brief slowing in the vehicle length direction, i.e. in the horizontal direction, takes place, a kind of tilting or pitch movement of the vehicle takes place which could be oppositely compensated by the pivoting movement of the upper part and lower part of the vehicle seat or of a vehicle cab. This can be supported in a sprung-type manner by means of the spring device and in a damping manner by means of a damping device, so that the introduced tilting movement can be vibration-dampened. When travelling over a raised area or a stone, the front wheel or the front part of the vehicle is thus preferably pushed upwards, which may result in a rotational movement of the vehicle about the contact area of the rear tyre. However, the mass inertia of the driver would like to move the vehicle seat further in translation. Here, a rotational degree of freedom for example is helpful so that the rotation of the vehicle brought about by the raising of the vehicle front part is not forced upon the driver.

By defining an imaginary or real axis about which this pivoting movement takes place and which at the same time may be the imaginary axis about which the vehicle rear moves in rotation when travelling over the ridge or the trough, so-called rotational degrees of freedom can be created. A kinematic mechanism for carrying out a pivoting movement according to these rotational degrees of freedom can be accommodated both on the vehicle, i.e. for example in the vehicle floor or a vehicle cab floor, and in the seat, i.e. directly in the vehicle seat, so that a real axis or else an imaginary axis about which the pivoting movement is carried out is arranged in these parts.

Such an imaginary or real axis is arranged below the upper part, so that the upper part can carry out a pivoting movement opposed to the pitch or tilting movement of the vehicle.

The pivoting movements of the pivotable upper part can be acted upon by means of the spring device with a spring force that counteracts the pivoting movement for vibration damping purposes. The vibrations introduced into the system of a vehicle seat or a vehicle cab are thus reduced and optionally damped by a spring action. The upper part may preferably be a vehicle seat upper part and the lower part may preferably be a vehicle seat lower part which is connected to a vehicle body part or frame part and/or to a vehicle cab part.

Likewise, the upper part may be a vehicle cab and the lower part may be a vehicle frame part or a vehicle body part or a part connected to said parts.

The vehicle seat upper part comprises a seat part and a backrest.

The vehicle seat upper part is preferably connected to the vehicle seat lower part by means of at least one pivot arm extending substantially in the vehicle height direction in such a way that the vehicle seat upper part moves in the forward and backward direction and in an upward and downward direction by means of a pivoting movement. This corresponds to a simple possible embodiment of the present invention for carrying out the pivoting movement of the upper part relative to the lower part.

The imaginary or real axis is displaceable in the transverse direction when vibrations occur. This means that, according to one preferred embodiment, the axis can additionally carry out a horizontal displacement in order for example to be able to absorb, by means of a spring device, vibrations introduced thereby for example which have a significant component in the horizontal direction. This may also be achieved in that, when vibrations occur, the upper part is displaceable relative to the lower part by means of an additional horizontal vehicle suspension device or a vehicle suspension device which runs parallel to the vehicle floor and a vehicle axle.

Further advantageous embodiments will emerge from the dependent claims.

Advantages and expedient features can be found in the following description in conjunction with the drawing, in which:

FIG. 1 shows in a schematic view a utility vehicle in its current vehicle position, and in a detail view the associated movement of a vehicle seat according to the prior art;

FIGS. 3-5 show in a schematic view a utility vehicle in its current vehicle position, and in a detail view the associated movement of a vehicle seat with a conventional longitudinal horizontal suspension in various positions;

FIGS. 6-8 show in a schematic view a utility vehicle in its current vehicle position, and in a detail view the associated movement of a vehicle seat according to one embodiment of the invention in various positions;

Figure 2:
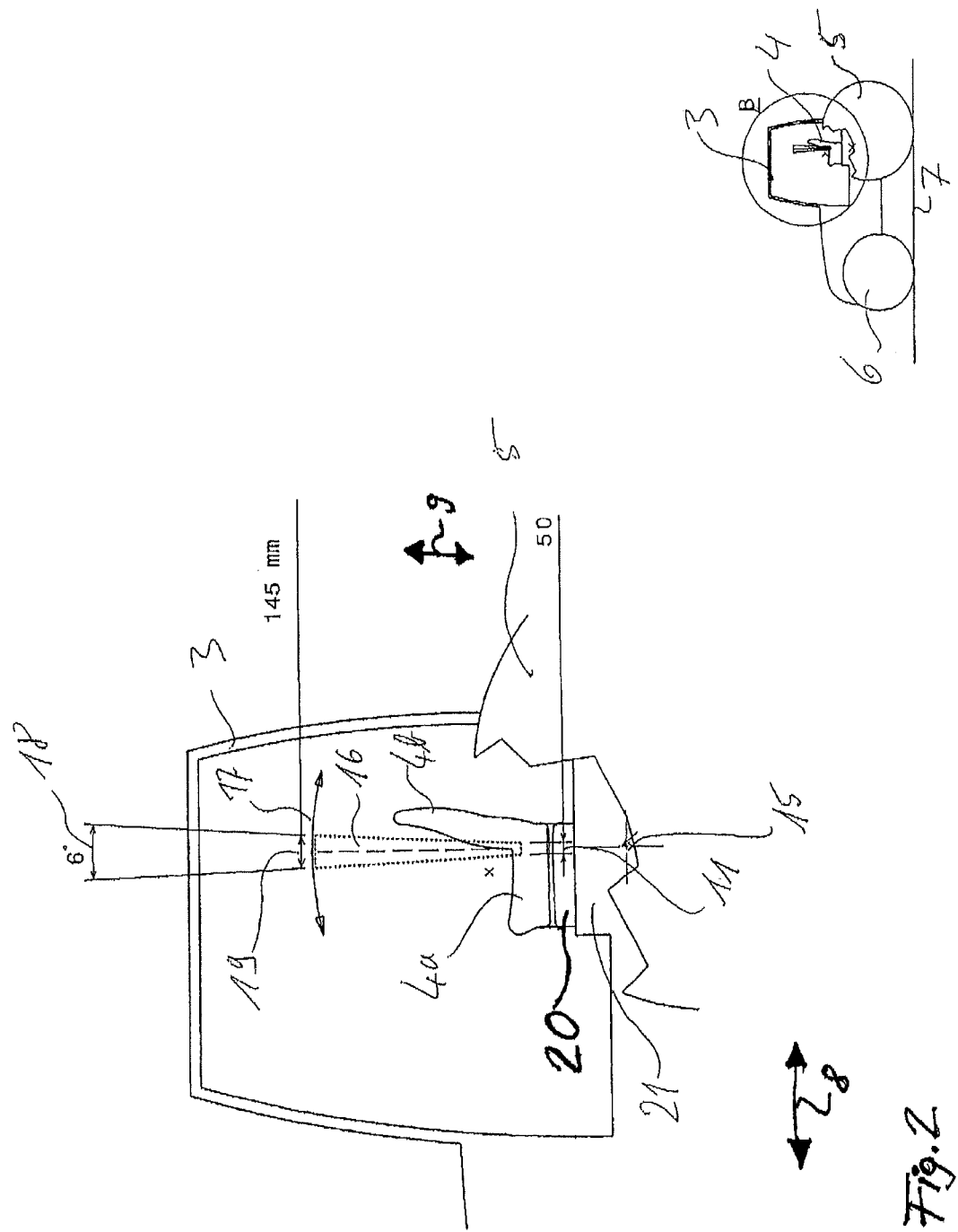
FIG. 2 shows in a schematic view a utility vehicle carrying out a pitch movement, and in a detail view the associated movement of a vehicle seat.

FIGS. 9-11 show in a schematic view a utility vehicle in its current vehicle position, and in a detail view the associated movement of a vehicle seat according to the basic principle of the invention in various positions of the vehicle seat; and FIG. 12 shows in a side view a schematic sketch of a possible construction for carrying out a pivoting movement with a vehicle suspension device according to one embodiment of the invention.

FIG. 1 shows in a schematic view a utility vehicle 1 on a road 7, and in a detail view the region of the vehicle seat including the vehicle cab with an illustrated displacement position of the vehicle seat when using a conventional longitudinal horizontal suspension as the vehicle suspension device according to the prior art. The utility vehicle 1 in the form of a tractor comprises a body 2, a vehicle cab 3, a vehicle seat 4 and rear and front wheels 5, 6. The vehicle is travelling with its wheels along the road 7.

If such a vehicle is equipped exclusively with a conventional longitudinal horizontal suspension as the vehicle suspension device, only one degree of freedom in the X direction, i.e. in the vehicle length direction, is provided for displacing and damping the horizontally introduced vibration. Such a conventional longitudinal horizontal suspension usually allows a spring travel of plus/minus 25 mm as shown by reference 12, i.e. overall a total displacement of the vehicle seat 4 of 50 mm as shown by reference 11. Such a degree of freedom which exists in the X direction, as depicted by displacing an imaginary line 10 forward and backward in the vehicle length direction 8, leads to an imaginary degree of freedom range 13 which clearly shows that the 50 mm spring travel and stroke length 11 is always the same regardless of the height of the point from which it is viewed. In other words, the vehicle seat 4 with its seat part 4a and its backrest 4b can be displaced forward and backward within this range when a vibration is introduced, without any pivoting movement. Reference 9 denotes the vehicle height direction.

FIG. 2 shows in a schematic view a utility vehicle with a detail showing the region of the vehicle seat and vehicle cab together with an illustrated movement of the vehicle when travelling over a pothole or a ridge. It can clearly be seen from this diagram that the vehicle carries out a kind of pitch or pivoting movement or a tilting movement to a slight degree, so that a pivoting movement about an axis 15 extending in the vehicle width direction takes place. This is also illustrated by the fact that the sides of the pivoting range 16 which delimit the pivoting range are at a greater spacing in their upper regions 18 and 19 than in a lower region, which with a spring travel length of 50 mm can still arise from a conventional longitudinal horizontal suspension, as already described in FIG. 1.

The pivoting movement of the vehicle is clear from the double-headed arrow 17 and the fact that, approximately in the head height region of the driver, i.e. at the height of the spacing 19, a movement in the vehicle length direction of 145 mm takes place, compared to 50 mm in the foot region. This corresponds to a pivoting of the vehicle and thus also of the vehicle seat 4 through 6°, i.e. through plus/minus 3° relative to a central axis.

The vehicle seat 4 advantageously comprises a vehicle seat upper part 4a and 4b and a vehicle seat lower part 20. Reference 21 additionally denotes a vehicle seat cab 3 with its cab floor and parts thereof.

FIG. 3 shows in a schematic view the utility vehicle together with a detail from the region of the vehicle seat together with the vehicle cab, as do FIG. 4 and FIG. 5 when using a conventional longitudinal horizontal suspension as the vehicle suspension device while simultaneously considering the pivoting movement of the vehicle. In FIG. 3, the position of the longitudinal horizontal suspension with regard to its spring travel is shown in a normal position, i.e. when not travelling over a ridge or a trough. In this case, no displacement of the vehicle seat in the vehicle length direction 8 is necessary. Instead, the vehicle seat is located in a non-displaced manner at a location indicated by the line 22. Superposed thereon is the range 16 which is intended to depict, in the event of an unevenness in the road, the pivoting movement of the vehicle and thus also of the vehicle seat—as already explained in FIG. 2.

As in FIG. 3, FIG. 4 shows a diagram of the utility vehicle and a detail of the region around the vehicle seat 4. In this case, the utility vehicle is travelling over a trough 7a, as a result of which a kind of pitch movement of the vehicle towards the front takes place. In order to isolate and eliminate the resulting forces and acceleration values which are generated in the system of the vehicle seat as a result of the vibrations introduced, the conventional longitudinal horizontal suspension is offset backwards by its maximum spring travel length of 25 mm. As a result, the driver sitting on the seat experiences a lesser effect of the vibration introduced.

However since, as shown by the range 16, the vehicle movement when travelling over the trough 7a is not a rectilinear introduction of vibrations in the X direction, but instead depicts a rotational movement, a residual travel 23 remains which cannot be neutralised by the conventional longitudinal horizontal suspension. This leads to the situation whereby, due to reaching the end stop of the longitudinal horizontal suspension, the driver is entrained by means of the backrest 4b in the rotational movement and as a result his head and back region is subjected to additional load.

In FIG. 5, the arrangement shown in FIGS. 3 and 4 is shown in a further position in which the utility vehicle is travelling over a ridge 7b. In this case, a pitch movement of the vehicle towards the rear is once again carried out. When using a conventional longitudinal horizontal suspension, the position of which is depicted by the line 22, this leads to the situation whereby a maximum spring travel length of 25 mm in the forward direction, i.e. towards the front of the vehicle, is used to neutralise in parts the backward tilting of the vehicle in the region of the vehicle seat having this longitudinal horizontal suspension. Nevertheless, a residual travel 24 remains which, due to the fact that the vehicle movement is not a rectilinear change in force and acceleration in the X direction but rather is a rotational movement and thus also an orientation of the associated forces and acceleration values, so that on account of this residual travel 24 the driver moves away from the backrest 4b and undesirably tilts forward.

FIGS. 6, 7 and 8 show a pivotable vehicle seat together with the position of the utility vehicle having a vehicle suspension device according to one embodiment of the invention. The vehicle 1 is travelling along a flat road without troughs and raised areas. Ideally, the vehicle seat can according to the invention, in the case where the vehicle travels over an unevenness, carry out a pivoting movement about an imaginary or real point of rotation or an axis 15 which extends in the vehicle width direction. This is illustrated by the pivoting range 25. Examples of values for such a maximum possible pivoting movement are in the head height region 147.7 mm as a distance in the vehicle length direction, which corresponds to an angle movement of 6°, i.e. plus/minus 3° relative to the central axis 26. This is illustrated by references 27 and 28. In FIG. 7, the structure shown in FIG. 6 is shown as the utility vehicle travels over a trough. The trough is denoted by reference 7. When travelling over the trough 7a, the vehicle experiences a pitch movement in the forward direction. According to the invention, at this moment the vehicle seat 4 is rotated backwards as shown by reference 29, in order to compensate by rotation the forward pitch movement. This rotation of the vehicle seat takes place about the point of rotation or axis of rotation 15. A rotational deflection in the form of a pivoting movement of 2.3° towards the rear as shown by reference 30 can thus take place for example, which leads to the situation whereby the driver in the head region is entrained in a synchronous and compensating manner with the movement of the vehicle seat and with the pitch movement of the vehicle, whereas in the lower region a displacement movement 11 within the range of the standard longitudinal horizontal suspension takes place.

In FIG. 8, the mode of operation shown in FIGS. 6 and 7 is shown in the case where the utility vehicle 1 travels over a ridge 7b in the road 7. Here, the utility vehicle carries out a pitch movement towards the rear, whereupon according to the invention the vehicle seat 4 carries out a compensating, opposing rotational movement or pivoting movement 30 towards the front. As a result, a pivoting range of 2.3° towards the front can be used for example as shown by reference 31. This leads to the situation whereby the driver in the head region is entrained in a synchronous manner with the pitch or rotational movement of the vehicle. It can be seen from FIGS. 7 and 8 that, as shown by the pivoting range 25, the vehicle seat in the Z direction, i.e. in the vehicle height direction 9, behaves congruently with the deflection range of the vehicle seat when carrying out a pitch movement of the vehicle.

FIGS. 9, 10 and 11 once again show a comparative view of the position of a vehicle seat when using a conventional longitudinal horizontal suspension and when using the rotationally acting vehicle suspension device according to the invention. In FIG. 9, the line 32 depicts the position of a longitudinal horizontal suspension relative to the vehicle length direction 8 when the utility vehicle 1 is at rest and travelling over flat ground, in a starting position.

In FIG. 10, the vehicle is travelling over a depression 7a, whereupon a pitch movement of the vehicle towards the front takes place. This leads to the situation whereby a conventional longitudinal horizontal suspension, like the rotationally acting vehicle suspension device according to the invention, is deflected rearwards. The conventional longitudinal horizontal suspension moves parallel to the cab floor 3a with a maximum travel length of 25 mm towards the rear, and the vehicle seat 4 remains with its underside parallel to the cab floor 3a. In the case of the rotationally acting vehicle suspension device according to the invention, on the other hand, the vehicle seat inclines backward with for example a maximum degree of pivoting or rotation of 3°, whereupon in the head region of the driver a greater travel length 33 of for example 46 mm compared to 25 mm is carried out. This advantageously has the result that, in the head region of the driver, the pitch movement of the vehicle can also be compensated more effectively in comparison to the conventional longitudinal horizontal suspension.

The same can be seen from FIG. 11 in which, when travelling over a ridge 7b, once again a travel difference 34 at the height of the driver's head can be achieved by the carrying-out of a pivoting movement of the vehicle seat by the vehicle suspension device according to the invention. In this case, a movement of the head is directed forwards in order to compensate for the backward pitch movement of the vehicle.

FIG. 12 shows in a side view a vehicle seat with a possible construction for mounting the vehicle seat upper part relative to a vehicle seat lower part 20 for carrying out a pivoting movement in the manner according to the invention. The vehicle seat comprising a seat part 4a and 4b is mounted relative to the lower part by means of at least one pivoting lever 40, which is connected in the regions 41 and 42 to the vehicle seat upper part on the one hand and to the vehicle seat lower part 20 on the other hand. The regions 41, 42 may be pivot axes which are either both or individually connected to the pivoting lever or to the upper part and to the lower part, respectively. The pivoting lever has spring elements 43 and 44 (shown schematically) on the left-hand and right-hand side, which are attached at their ends to stationary elements 45 and 46. These spring elements 43 and 44 allow the pivoting lever 40 to pivot forwards and backwards as soon as a pivoting movement 47 is necessary. Such a pivoting movement is necessary when the vehicle (not shown here), in which the vehicle seat is arranged, carries out a forward or backward pitch movement and the vehicle seat is to be pivoted in the opposite direction by means of a pivoting movement for compensation purposes. This pivoting movement is brought about by the introduced vibration, which is generated by the pitch movement of the vehicle. The spring elements 43 and 44 act counter to this pivoting movement in order to reduce the vibration of the vehicle seat.

All of the features disclosed in the application documents are claimed as essential to the invention in so far as they are novel individually or in combination with respect to the prior art.

LIST OF REFERENCES 1 utility vehicle
2 body
3 vehicle cab
3a cab floor
4 vehicle seat
4a seat part
4b backrest
5, 6 front and rear wheels
7 road
7a trough
7b ridge
8 vehicle length direction
9 vehicle height direction
10 imaginary line
11 total displacement/stroke length
12 spring travel
13 degree of freedom range
15 axis
16 pivoting range
17 double-headed arrow
18, 19 upper regions
20 vehicle seat lower part
21 cab floor
22 line
23, 24 residual travel
25 pivoting range
26 central axis
27, 28 angle movement
29 rotation
30 pivoting movement
31 pivoting range
32 line
33 travel length
34 travel difference
37 pivoting movement
40 pivoting lever
41, 42 regions
43, 44 spring elements
45, 46 stationary elements
47 pivoting movement

The invention claimed is:

1. A vehicle suspension device for a vehicle seat or a vehicle cab comprising a lower part and an upper part spring-mounted relative to the lower part by means of at least one spring means, characterized in that the upper part is mounted relative to the lower part in such a way that it is pivotable about an imaginary or real axis extending in a vehicle width direction or a vehicle length direction when vibrations occur between the upper part and the lower part, wherein the imaginary or real axis is disposed below the lower part, wherein an angle of movement of plus or minus approximately 3 degrees relative to a central axis is allowed.

2. The vehicle suspension device according to claim 1, wherein the imaginary or real axis is arranged below the upper part.

3. The vehicle suspension device according to claim 1, wherein pivoting movements of the pivotable upper part can be acted upon by means of the spring device with a spring force that counteracts the pivoting movement for vibration damping purposes.

4. The vehicle suspension device according to claim 1, wherein the upper part is a vehicle seat upper part and the lower part is a vehicle seat lower part which is connected to a vehicle body part or frame and/or to a vehicle cab part.

5. The vehicle suspension device according to claim 4, wherein the vehicle seat upper part comprises a seat part with a backrest.

6. The vehicle suspension device according to claim 1, wherein the vehicle seat upper part is connected to the vehicle seat lower part by means of at least one pivot arm extending substantially in the vehicle height direction in such a way that the vehicle seat upper part moves in the forward and backward direction (8) and in an upward and downward direction.

7. The vehicle suspension device according to claim 1, wherein the upper part is the vehicle cab and the lower part is a vehicle frame part.

8. The vehicle suspension device according to claim 1, further comprising a horizontal suspension extending in the vehicle length direction and a horizontal suspension extending in the vehicle width direction, wherein the imaginary or real axis is displaceable in the transverse direction when vibrations occur.

9. The vehicle suspension device according to claim 1, wherein the upper part is displaceable relative to the lower part when vibrations occur.

10. The vehicle suspension device according to claim 1, wherein the imaginary or real axis is displaceable in the transverse direction when vibrations occur, and wherein the vehicle suspension device includes a horizontal suspension device which runs substantially parallel to a floor of the vehicle allowing the vehicle seat to both pivot around the imaginary or real axis and be displaced horizontally when vibrations occur.

11. The vehicle suspension device according to claim 1, wherein the at least one springs means is aligned substantially with a horizontal plain of the vehicle.

12. A vehicle suspension device for a vehicle seat or a vehicle cab comprising:
- a lower part;
- an upper part;
- at least one pivot arm;
- wherein the upper part is pivotally connected to the lower part by the at least one pivot arm;
- wherein the upper part can pivot plus or minus approximately 3 degrees about an imaginary or real axis extending in a vehicle width direction or a vehicle length direction relative to a central axis;
- wherein the at least one pivot arm extends substantially in a vehicle height direction in such a way that the upper part can move in the vehicle length direction and in the vehicle height direction; and
- wherein the at least one pivot arm is interconnected to the lower part by at least one spring means, the spring means aligned substantially with a horizontal plain of the vehicle such that pivoting movements of the upper part can be acted upon with a spring force that counteracts the pivoting movements.

13. The vehicle suspension device according to claim 12, wherein the imaginary or real axis is disposed below the lower part.

* * * * *